United States Patent [19]

Harsono et al.

[11] 4,166,047

[45] Aug. 28, 1979

[54] HYDROTHERMAL TREATMENT OF SILICA

[75] Inventors: Radjasa Harsono; Willem H. J. Stork, both of Amsterdam, Netherlands

[73] Assignee: Shell Oil Company, Houston, Tex.

[21] Appl. No.: 850,984

[22] Filed: Nov. 14, 1977

[30] Foreign Application Priority Data

Dec. 2, 1976 [NL] Netherlands .......................... 7613414

[51] Int. Cl.$^2$ .......................... B01J 21/08; B01J 21/12
[52] U.S. Cl. .............................. 252/454; 252/455 R; 252/459
[58] Field of Search ................... 252/455 R, 457, 459, 252/454

[56] References Cited

U.S. PATENT DOCUMENTS

| | | | |
|---|---|---|---|
| 3,404,097 | 10/1968 | Wilson, Jr. et al. | 252/457 |
| 3,637,529 | 1/1972 | Van Beek et al. | 252/454 |
| 3,843,341 | 10/1974 | Hammel et al. | 252/459 |
| 3,849,338 | 11/1974 | Daumas et al. | 252/457 |
| 3,898,182 | 8/1975 | Brown et al. | 252/455 R |
| 3,969,274 | 7/1976 | Frampton | 252/457 |
| 3,996,162 | 12/1976 | McCall | 252/457 |
| 4,035,261 | 7/1977 | Hargrove et al. | 252/455 R |

FOREIGN PATENT DOCUMENTS

| | | |
|---|---|---|
| 745890 | 3/1956 | United Kingdom . |
| 1003957 | 9/1965 | United Kingdom . |
| 1415273 | 11/1975 | United Kingdom . |

*Primary Examiner*—George Crasanakis
*Attorney, Agent, or Firm*—Ronald R. Reper

[57] ABSTRACT

A process is disclosed for suppressing the increase in specific average pore diameter which often occurs when a silica is subjected to a hydrothermal treatment, which includes the presence of one or more compounds of the elements lithium, potassium, sodium, rubidium, cesium, strontium or barium and which also includes in the hydrothermal treatment an added amount of at least one water-soluble titanium compound in an amount of about 0.1–5 grams per 100 grams of silica.

5 Claims, No Drawings

HYDROTHERMAL TREATMENT OF SILICA

BACKGROUND OF THE INVENTION

The invention relates to a process for suppressing the increase in specific average pore diameter which occurs when a silica is subjected to a hydrothermal treatment.

Porous silica is used widely, inter alia, as a drying agent, a catalyst, a catalyst carrier and as an adsorbent in chromatographic separations. In each of these applications the specific average pore diameter will, for the sake of brevity, be indicated by the letter p. For further information about p and the way in which it is determined reference is made to Netherlands patent application No. 7214397 or U.S. Pat. No. 3,925,197 wherein in column 3 this catalyst characteristic is discussed in detail.

It is very important that once a silica has the proper p for a certain application, this p should change as little as possible during all further treatments to which the silica is subjected. However, sometimes the problem arises that p of a silica increases when it is subjected to a hydrothermal treatment, by which is understood that the silica is treated at elevated temperature with liquid water and/or water vapor.

For reasons hitherto unknown, with a number of silicas the hydrothermal treatment has little or no effect on p. It has further been found that under certain conditions of temperature and pressure a hydrothermal treatment may cause a much stronger increase in p with one silica than with another. Generally, when a silica shows a distinct increase in p upon hydrothermal treatment, this increase is larger as the treatment is effected under more severe conditions, i.e. at a higher temperature and/or pressure.

For the application of silica as catalysts and catalyst supports, particularly for hydrocarbon treating processes such as hydrodesulphurization and demetallization of residual oils, as well as in the regeneration of such catalysts, the problem concerning the increase in p of silicas under hydrothermal conditions has been troublesome. It was decided to carry out an extensive investigation to provide more insight into this matter. In this investigation it was found that the increase in p, which occurs when silicas are subjected to a hydrothermal treatment, can be greatly suppressed by carrying out said hydrothermal treatment in the presence of an added quantity of at least one compound of any of the elements magnesium, iron, aluminum and titanium.

This finding is thought to be very important, because it greatly enhances the applicability of silicas and in principle enables silicas to be exposed to hydrothermal conditions without the risk of too great an increase in p. This finding is the subject of the present patent application.

SUMMARY OF THE INVENTION

The present application relates to a process for suppressing the increase in p which occurs when a silica is subjected to a hydrothermal treatment, the treatment being carried out in the presence of an added quantity of at least one compound of an element selected from magnesium, iron, aluminum and titanium.

DESCRIPTION OF PREFERRED EMBODIMENTS

In the process according to the invention the silica comes into contact at elevated temperature with liquid water and/or water vapor. This contact may occur at atmospheric pressure as well as at elevated pressure.

When in the process according to the invention the silica comes into contact with liquid water, and also when it comes into contact with water vapor, the addition of the compounds of any one or more of the elements magnesium, iron, aluminum and titanium may occur by emplacing these compounds on the silica before it comes into contact with the liquid water or the water vapor. The emplacement of the compounds concerned on the silica may very suitably be effected by impregnating the silica with one or more solutions of the compounds concerned followed by drying and, if necessary, calcination. When the silica comes into contact with liquid water at elevated temperatures, the addition of the compounds concerned may also very suitably be carried out by adding water-soluble compounds to this water.

In the embodiments of the process according to the invention described sofar the compounds concerned are added either to the silica prior to the hydrothermal treatment, or to the liquid water used in the hydrothermal treatment. The process according to the invention may also be carried out successfully using a combination of the two ways of addition. To this end the compounds concerned are first emplaced on the silica, after which it is treated, at an elevated temperature, with liquid water to which the compounds concerned have been added.

The quantity of the compounds to be added in the process according to the invention is substantially determined by the five following factors:
(1) The increase in p deemed permissible;
(2) The temperature used in the treatment;
(3) The pressure used in the treatment;
(4) The quantities of Mg, Al and Ti present in the silica to be treated.
(5) The quantities of potassium, sodium and calcium present in the silica to be treated.

When the impregnation route is used, the quantities of the compounds concerned which in the most common cases have to be incorporated into the silica to achieve the effect envisaged, are as a rule such that the silica to be treated contains more than 0.1 g and not more than 5 g of the active element per 100 g.

The quantity of the compounds concerned to be used to realize a certain degree of suppression of the increase in p can, under specific conditions of the hydrothermal treatment, be determined with the aid of some simple experiments.

The process according to the invention is in general important for suppressing the increase in p which occurs when silicas are exposed to hydrothermal conditions. The process is important especially in the use of silicas as catalysts and catalyst carriers, in particular for hydrocarbon treating processes such as hydrodesulphurization and demetallization of residual oils and in the regeneration of such catalysts.

The present application is based on results of a thorough investigation, carried out by the applicant, into the influence of hydrothermal conditions on p of silicas. The investigation also constitutes the basis for the related Netherlands patent application No. 7613413, which aims at increasing p of a silica by subjecting this silica to a hydrothermal treatment in the presence of an added quantity of one or more compounds selected from the group formed by compounds of the elements lithium, potassium, sodium, cesium, rubidium, calcium, strontium and barium as well as ammonium compounds and ammonia. Although this patent application is also based on investigation of hydrothermal treatment, their aims are opposite. Whereas the process according to Netherlands patent application No. 7613413 aims at stimulating the effect of a hydrothermal treatment on p of silicas as much as possible, the process according to the present patent application, on the contrary, aims at suppressing this effect as much as possible. Continued investigation of this matter has led to the following interesting process combination.

Suppose that a silica is available which, as regards such properties as particle size, total pore volume and mechanical strength, is considered very suitable for a certain application, but that this silica has too small a p to be eligible for this application. According to Netherlands patent application No. 7613413 a silica having the proper p can be prepared from this silica in a simple way by subjecting it to a hydrothermal treatment in the presence of an added quantity of one or more of the compounds mentioned in that patent application. As a result of this treatment the susceptibility of the silica for hydrothermal conditions has greatly increased. When the silica is subsequently used for an application in which it is exposed to hydrothermal conditions, there is a great risk of the p of the silica exceeding the permissible value. By applying the process according to the present patent application to a silica whose p has been increased according to Netherlands patent application No. 7613413, this problem is obviated and a silica is obtained whose p is considerably less sensitive to hydrothermal conditions.

The above-described process combination can very suitably be used in the hydrodemetallization of residual oils using a catalyst consisting substantially of silica in cases where the available silica has too small a p and where it is, moreover, intended in the regeneration of the deactivated catalyst to use a hydrothermal treatment such as a steam treatment.

The invention will now be explained with reference to the following example.

EXAMPLE

Six different hydrothermal treatments (1–6) were applied to two silicas (I and II) and to ten silicas (IA–IJ and IIA) which had been prepared from silicas I and II as the starting materials. Silicas I and II had an Al-content of 0.1%w, a total pore volume of 0.9 ml/g, a crushing strength higher than 16.7 kg/cm$^2$, and they were available in the form of spheres with a diameter of 1–3 mm. Silica I had a p of 10 nm and a sodium-content of 0.7%w. The preparation of silicas IA, IB and IC was effected by impregnating three portions of silica I with an aqueous solution of Al(NO$_3$)$_3$, followed by drying at 120° C. and two hours' calcination at 400° C. The silicas IA, IB and IC thus obtained had Al-contents of 1.1, 2.6 and 5.1%w, respectively. The preparation of silicas ID, IE and IF was effected by impregnating three portions of silica I with a solution pg,6 Ti(OC$_3$H$_7$)$_4$ in a mixture of isopropyl alcohol and acetylacetone followed by drying at 120° C. and two hours' calcination at 400° C. The silicas ID, IE and IF thus obtained had Ti-contents of 1, 2.5 and 5%w, respectively. The preparation of silicas IG, IH and IJ was effected by impregnating three portions of silica I with aqueous solutions of Fe(NO$_3$)$_3$, Mg(NO$_3$)$_2$ and Na$_2$CO$_3$, respectively, followed by drying at 120° C. and two hours' calcination at 400° C. The silicas IG, IH and IJ thus obtained had a Fe-content of 1%w, a Mg-content of 2%w and a Na-content of 0.6%w, respectively. The preparation of silica IIA was effected by impregnating a portion of silica II with an aqueous solution of Al(NO$_3$)$_3$, followed by drying at 120° C. and two hours' calcination at 400° C. Silica IIA thus obtained had an Al-content of 2.6%w.

The various hydrothermal treatments were carried out as follows.

Treatment 1

A mixture of 15 ml silica and 19 ml water was heated in an autoclave under autogenous pressure to 230° C. and then maintained at this temperature for two hours.

Treatment 2

A mixture of 15 ml silica and 19 ml of an aqueous $2 \times 10^{-3}$ molar Na$_2$CO$_3$ solution was heated in an autoclave under autogenous pressure to 230° C. and then maintained at this temperature for two hours.

Treatment 3

This treatment was carried out in substantially the same way as treatment 1, the difference being that in the present case a temperature of 270° C. was used.

Treatments 4 and 5

A mixture of 15 ml silica and 19 ml of an aqueous Al(NO$_3$)$_3$ solution having a certain molarity was heated in an autoclave under autogenous pressure to 270° C. and then maintained at this temperature for two hours. The aqueous Al(NO$_3$)$_3$ solutions used in treatments 4 and 5 had a molarity of $10^{-2}$ and $10^{-1}$, respectively.

Treatment 6

Fifteen ml silica was treated for one hour with water vapor at a temperature of 350° C., a partial pressure of water (P$_{H2O}$) of 40 bar and a linear velocity of 10 cm/h.

The results of the experiments are given in the following table. For the determination of p of the silicas use was made of the nitrogen adsorption/desorption method and of the mercury penetration method, as described in Netherlands patent application No. 7214397.

Table

| Exp. No. | Silica No. | Hydrothermal treatment No. | p of the silica after hydrothermal treatment, nm |
|---|---|---|---|
| A | I | 1 | 18 |
| B | I | 2 | 65 |
| 1 | IA | 2 | 14 |
| 2 | IB | 2 | 12 |
| 3 | IC | 2 | 10 |
| 4 | ID | 2 | 36 |
| 5 | IE | 2 | 24 |
| 6 | IF | 2 | 21 |
| 7 | IG | 2 | 20 |
| 8 | IH | 2 | 16 |
| C | IJ | 3 | 950 |
| 9 | IJ | 4 | 800 |
| 10 | IJ | 5 | 12 |
| D | II | 6 | 1350 |
| 11 | IIA | 6 | 15 |

Of the experiments listed only Nos. 1–11 are experiments according to the invention. Experiments A–D are outside the scope of the invention and have been included in the patent application for comparison.

The results presented in the table give rise to the following remarks.

(1) Comparison of experiments A and B shows that the effect of a hydrothermal treatment with liquid water on p of a silica is greater when a Na-compound is dissolved in the water.

(2) Comparison of experiments B, 1, 2 and 3, experiments B, 4, 5 and 6, experiments B and 7 and experiments B and 8 with each other shows that the effect on p of a silica of a hydrothermal treatment carried out with liquid water in which a Na-compound has been dissolved is strongly suppressed when the Al-, the Ti-, the Fe- and the Mg-content, respectively, of the silica has previously been increased by impregnation with a compound of one of these elements.

(3) Comparison of experiments C, 9 and 10 with each other shows that the effect of a hydrothermal treatment carried out with liquid water on p of a silica whose Na-content has previously been increased by impregnation with a Na-compound, is strongly suppressed when an Al-compound has been dissolved in the water.

(4) Comparison of experiments D and 11 shows that the effect of a hydrothermal treatment carried out with water vapor on p of a silica is strongly suppressed when the Al-content of the silica has previously been increased by impregnation with an Al-compound.

What is claimed is:

1. A process for suppressing the increase in specific average pore diameter which occurs when silica is hydrothermally treated in the presence of one or more compounds of elements selected from the group consisting of lithium, potassium, sodium, rubidium, cesium, strontium, and barium, which comprises carrying out the hydrothermal treatment of said silica with an added quantity of from about 0.1 to 5 g per 100 g of silica of at least one water-soluble titanium compound.

2. A process according to claim 1, wherein said at least one titanium compound is emplaced on the silica before it is hydrothermally treated.

3. A process according to claim 2, wherein the emplacement of the titanium compound is effected by impregnating the silica with one or more solutions of the compounds followed by drying.

4. A process according to claim 1, wherein said at least one titanium compound is added in the form of water-soluble compounds to the liquid water that is used for hydrothermal treatment.

5. A process according to claim 1, wherein said at least one titanium compound is emplaced on the silica before it is hydrothermally treated and then hydrothermally treating the silica at elevated temperature with liquid water to which said at least one titanium compound has been added.

* * * * *